(12) United States Patent
Hahn

(10) Patent No.: US 12,245,085 B2
(45) Date of Patent: Mar. 4, 2025

(54) METHOD AND DEVICE FOR GROUP HANDOVER IN COMMUNICATION SYSTEM

(71) Applicants: Hyundai Motor Company, Seoul (KR); Kia Corporation, Seoul (KR)

(72) Inventor: Gene Back Hahn, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 333 days.

(21) Appl. No.: 17/621,606

(22) PCT Filed: Jun. 19, 2020

(86) PCT No.: PCT/KR2020/008004
§ 371 (c)(1),
(2) Date: Dec. 21, 2021

(87) PCT Pub. No.: WO2021/002615
PCT Pub. Date: Jan. 7, 2021

(65) Prior Publication Data
US 2023/0224765 A1    Jul. 13, 2023

Related U.S. Application Data

(60) Provisional application No. 62/869,214, filed on Jul. 1, 2019.

(51) Int. Cl.
*H04W 36/00* (2009.01)
*H04W 36/08* (2009.01)
*H04W 92/18* (2009.01)

(52) U.S. Cl.
CPC .......... *H04W 36/0009* (2018.08); *H04W 36/0058* (2018.08); *H04W 36/08* (2013.01); *H04W 92/18* (2013.01)

(58) Field of Classification Search
CPC ......... H04W 36/0009; H04W 36/0058; H04W 36/08; H04W 92/18; H04W 76/14;
(Continued)

(56) References Cited

U.S. PATENT DOCUMENTS

| 2008/0014941 A1* | 1/2008 | Catovic ............... H04W 36/30 455/436 |
| 2016/0374139 A1* | 12/2016 | Chen ............... H04W 28/0268 |

(Continued)

FOREIGN PATENT DOCUMENTS

KR    2017-0113755 A    10/2017

OTHER PUBLICATIONS

"Consideration on NR V2X physical layer procedure", 3GPP TSG RAN WG1 #97 Reno, USA, May 13-17, 2019 (R1-1907337) (Year: 2019).*

(Continued)

*Primary Examiner* — Sun Jong Kim
(74) *Attorney, Agent, or Firm* — Fox Rothschild LLP

(57) ABSTRACT

Disclosed are a method and a device for group handover in a communication system. An operation method of a header terminal comprises the steps of: transmitting a configuration information message including a first indicator indicating a measurement reporting subject to member terminals participating in the sidelink groupcast communication; if the measurement reporting subject indicated by the first indicator is the header terminal, receiving, from the member terminals, measurement reporting messages including results of measurement operations performed for at least one neighboring base station; and transmitting a configuration reporting message including the results of the measurement operations to a serving base station accessed by the header terminal.

9 Claims, 8 Drawing Sheets

(58) Field of Classification Search
CPC ..... H04W 76/34; H04W 24/10; H04W 76/40; H04W 4/40; H04W 36/0072; H04W 36/0077

See application file for complete search history.

(56) References Cited

U.S. PATENT DOCUMENTS

| | | | |
|---|---|---|---|
| 2017/0295531 | A1 | 10/2017 | Singh et al. |
| 2019/0104452 | A1* | 4/2019 | Park .................... H04W 36/185 |
| 2019/0327642 | A1* | 10/2019 | Peng .................... H04W 28/08 |
| 2020/0008266 | A1* | 1/2020 | Pan ...................... H04L 1/1642 |
| 2020/0015133 | A1* | 1/2020 | Yang .................... H04W 36/08 |
| 2021/0058747 | A1* | 2/2021 | Luo ..................... H04W 76/12 |
| 2022/0408226 | A1* | 12/2022 | Fehrenbach ........ H04W 84/047 |

OTHER PUBLICATIONS

"AS-related group communication for platooning" 3GPP TSG-RAN WG2#106, Reno, USA, May 13-17, 2019 (R2-1907422) (Year: 2019).*

3GPP TSG RAN WG1 #97, R1-1907337 Reno, USA, May 13-17, 2019, Agenda Item: 7.2.4.5, Source:Apple, Title:Considerations on NR V2X physical layer procedure, Document for: Discussion/Decision.

3GPP TSG-RAN WG2#105, R2-1902037, Athens, Greece, Feb. 25-Mar. 1, 2019, Agenda Item:11.4.2.1, Source:Huawei, HiSilicon, Title:AS-related group communication for platooning, Document for: Discussion and Decision.

3GPP TSG-RAN WG2#106, R2-1907422, Reno, USA, May 13-17, 2019 (Revision of R2-1904882), Agenda Item: 11.4.8, Source:Huawei, HiSilicon, Title:AS-related group communication for platooning, Document for:Discussion and Decision.

* cited by examiner

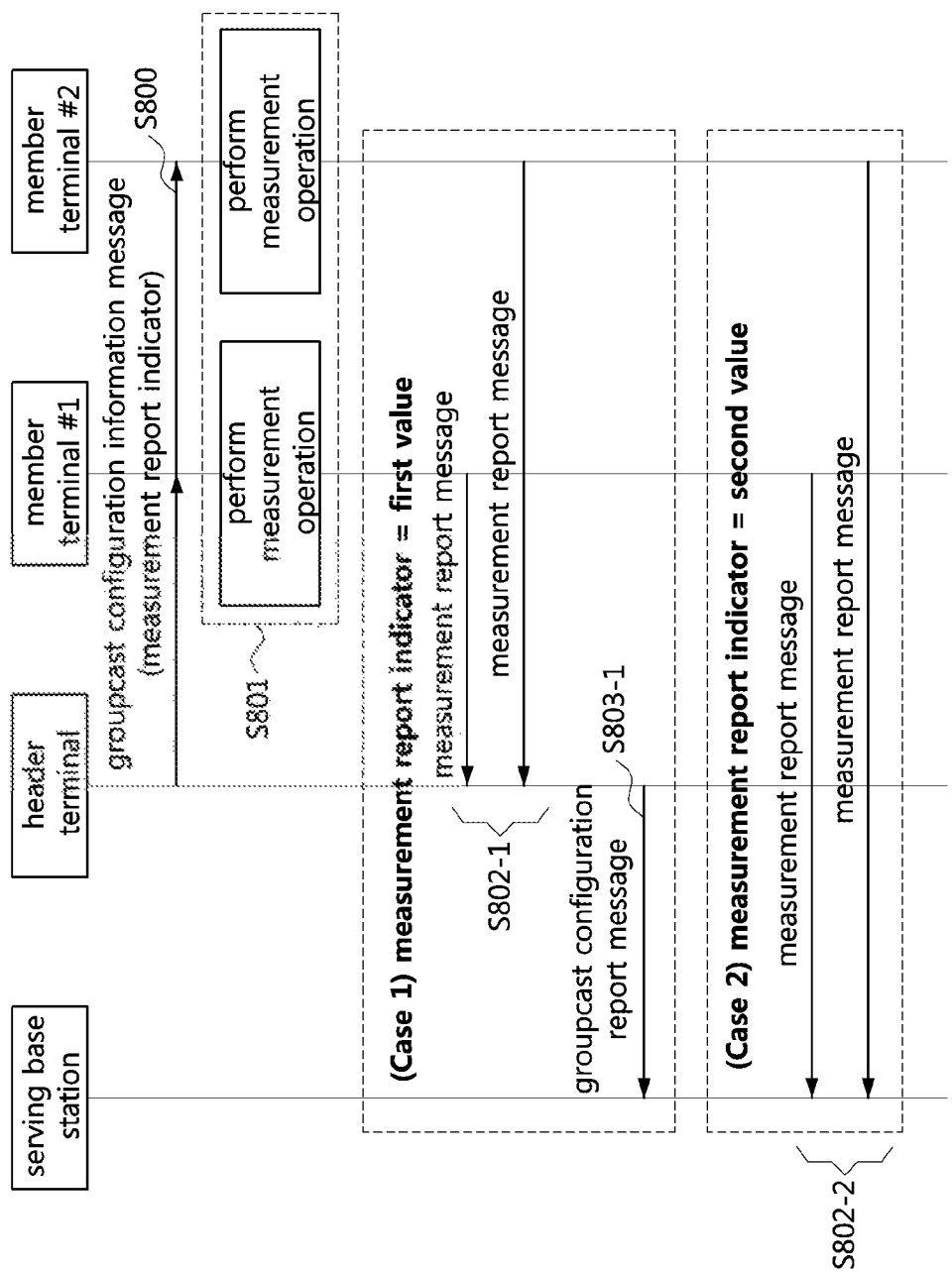

METHOD AND DEVICE FOR GROUP HANDOVER IN COMMUNICATION SYSTEM

CROSS-REFERENCE TO RELATED APPLICATIONS

This application is a National Phase application filed under 35 USC 371 of PCT International Application No. PCT/KR2020/008004 with an International Filing Date of Jun. 19, 2020, which claims priority from U.S. Provisional Application 62/869,214 filed on Jul. 1, 2019. The entire contents of these applications are incorporated herein by reference in their entirety.

BACKGROUND

(a) Technical Field

The present disclosure relates to a sidelink communication technique, more particularly, to a group handover technique in sidelink communication performed in a groupcast scheme.

(b) Description of the Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels.

Meanwhile, vehicles (e.g., communication nodes located in the vehicles) participating in platooning may communicate with a base station (e.g., road side unit (RSU)). In addition, sidelink communications may be performed between the vehicles participating in the platooning. One vehicle among the vehicles participating in the platooning may be referred to as a platoon leader (PL), and the PL may mean a terminal (e.g., header terminal) located in the corresponding vehicle. Among the vehicles participating in the platooning, the remaining vehicles other than the PL may be referred to as platoon members (PMs), and each PM may mean a terminal (e.g., member terminal) located in the corresponding vehicle.

The vehicles participating in the platooning may perform sidelink communications (hereinafter, referred to as 'sidelink groupcast communication') in a groupcast scheme. The vehicles (e.g., terminals located in the vehicles) participating in the sidelink groupcast communication may belong to one groupcast group. Each of the terminals belonging to the groupcast group may perform a handover operation. In this case, base stations (e.g., serving base stations) to which the terminals belonging to the same groupcast group are connected may be different from each other. For example, when member terminals #1 and #2 belong to the same groupcast group, the member terminal #1 may be connected to a base station #1, and the member terminal #2 may be connected to a base station #2. Sidelink resources allocated by the base station #1 to the member terminal #1 may overlap with sidelink resources allocated by the base station #2 to the member terminal #2. In this case, since the performance of sidelink communications (e.g., sidelink groupcast communication) is deteriorated, methods for solving such the problem are required.

SUMMARY

An objective of the present disclosure for solving the above-described problem is to provide a method and an apparatus for group handover in sidelink groupcast communication.

An operation method of a header terminal, according to a first exemplary embodiment of the present disclosure for achieving the objective, may comprise: transmitting, to member terminals participating in the sidelink groupcast communication, a configuration information message including a first indicator indicating a target of measurement reporting; receiving, from the member terminals, measurement report messages including results of measurement operations on one or more neighbor base stations when the target of measurement reporting indicated by the first indicator is the header terminal; and transmitting, to a serving base station to which the header terminal is connected, a configuration report message including the results of the measurement operations.

Each of the measurement report messages may include at least one of an identifier of a member terminal transmitting the measurement report message, reception quality information, an identifier of a neighbor base station related to the reception quality information, or combinations thereof.

The measurement report messages may be received when a handover event occurs in the member terminals, whether the handover event occurs may be determined based on an offset or a threshold value, and the offset or the threshold value may be included in the configuration information message.

The configuration report message may further include information indicating a number of the member terminals and an identifier of each of the member terminals.

The operation method may further comprise: receiving, from the serving base station, a first connection reconfiguration message including configuration information of a target base station determined based on the results of the measurement operations, transmitting a second connection reconfiguration message including the configuration information of the target base station to the member terminals;

and performing an access procedure with the target base station based on the configuration information of the target base station.

The configuration information of the target base station may include an identifier of the target base station and resource pool information of the target base station.

The second connection reconfiguration message may further include a second indicator indicating application of configuration information of the serving base station and the configuration information of the target base station.

The operation method may further comprise, when the access procedure between the header terminal and the target base station is completed, transmitting, to the member terminals, a connection completion message indicating release of connection with the serving base station.

An operation method of a header terminal, according to a second exemplary embodiment of the present disclosure for achieving the objective, may comprise: transmitting, to member terminals participating in the sidelink groupcast communication, a configuration information message including a first indicator indicating a target of measurement reporting; receiving, from a serving base station, a first connection reconfiguration message including configuration information of a target base station determined based on results of measurement operations performed in the member terminals, when the target of measurement reporting indicated by the first indicator is the serving base station, transmitting, to the member terminals, a second connection reconfiguration message including the configuration information of the target base station; and performing an access procedure with the target base station based on the configuration information of the target base station.

The operation method may further comprise, before receiving the first connection reconfiguration message, receiving, from the serving base station, a mobility notification message indicating that a handover operation to the target base station is to be performed based on the results of the measurement operations performed in the member terminals.

The mobility notification message may include an identifier of each of the member terminals having transmitted the results of the measurement operations to the serving base station.

The configuration information of the target base station may include an identifier of the target base station and resource pool information of the target base station, and the second connection reconfiguration message may further include a second indicator indicating application of configuration information of the serving base station and the configuration information of the target base station.

The operation method may further comprise, when the access procedure between the header terminal and the target base station is completed, transmitting, to the member terminals, a connection completion message indicating release of connection with the serving base station.

An operation method of a member terminal, according to a third exemplary embodiment of the present disclosure for achieving the objective, may comprise: receiving, from a header terminal managing the sidelink groupcast communication, a configuration information message including a first indicator indicating a target of measurement reporting; performing a measurement operation on a serving base station to which the header terminal is connected and one or more neighbor base stations; transmitting, to the header terminal, a measurement report message including a result of the measurement operation when the target of measurement reporting indicated by the first indicator is the header terminal; and receiving, from the header terminal, a connection reconfiguration message including configuration information of a target base station determined by the serving base station.

The measurement report message may be transmitted when a handover event occurs, whether the handover event occurs may be determined based on an offset or a threshold value, and the offset or the threshold value may be included in the configuration information message.

The operation method may further comprise receiving, from the serving base station, system information including the first indicator.

The operation method may further comprise, when the access procedure between the header terminal and the target base station is completed, receiving, from the header terminal, a connection completion message indicating release of connection with the serving base station.

An operation method of a member terminal, according to a fourth exemplary embodiment of the present disclosure for achieving the objective, may comprise: receiving, from a header terminal managing the sidelink groupcast communication, a configuration information message including a first indicator indicating a target of measurement reporting; performing a measurement operation on a serving base station to which the header terminal is connected and one or more neighbor base stations; transmitting, to the serving base station, a measurement report message including a result of the measurement operation when the target of measurement reporting indicated by the first indicator is the serving base station; and receiving, from the header terminal, a connection reconfiguration message including configuration information of a target base station determined by the serving base station.

The configuration information of the target base station may include an identifier of the target base station and resource pool information of the target base station, and the connection reconfiguration message may further include a second indicator indicating application of configuration information of the serving base station and the configuration information of the target base station.

The operation method may further comprise, when the access procedure between the header terminal and the target base station is completed, receiving, from the header terminal, a connection completion message indicating release of connection with the serving base station.

Advantageous Effects

According to the present disclosure, a header terminal that manages/controls sidelink groupcast communication may transmit, to member terminals, information indicating a target (e.g., the header terminal or a serving base station) of reporting a results of measurement operations. The member terminals may transmit results of measurement operations to the target indicated by the header terminal. When the target of reporting is the header terminal, the header terminal may inform the serving base station of the results of the measurement operations received from the member terminals. The serving base station may determine one target base station based on the results of the measurement operations. Configuration information of the target base station may be transmitted to the header terminal and the member terminals. In this case, the header terminal and the member terminals may perform handover operations to the same target base station. Accordingly, a resource collision problem, which occurs when the terminals (e.g., header terminal and member terminals) participating in the sidelink groupcast communication perform handover operations to different target base stations, can be resolved. Consequently, the performance of the communication system can be improved.

BRIEF DESCRIPTION OF DRAWINGS

FIG. 9B is a sequence chart illustrating a first exemplary embodiment of a method of accessing a target base station in a group handover procedure.

DETAILED DESCRIPTION

Figure 1:
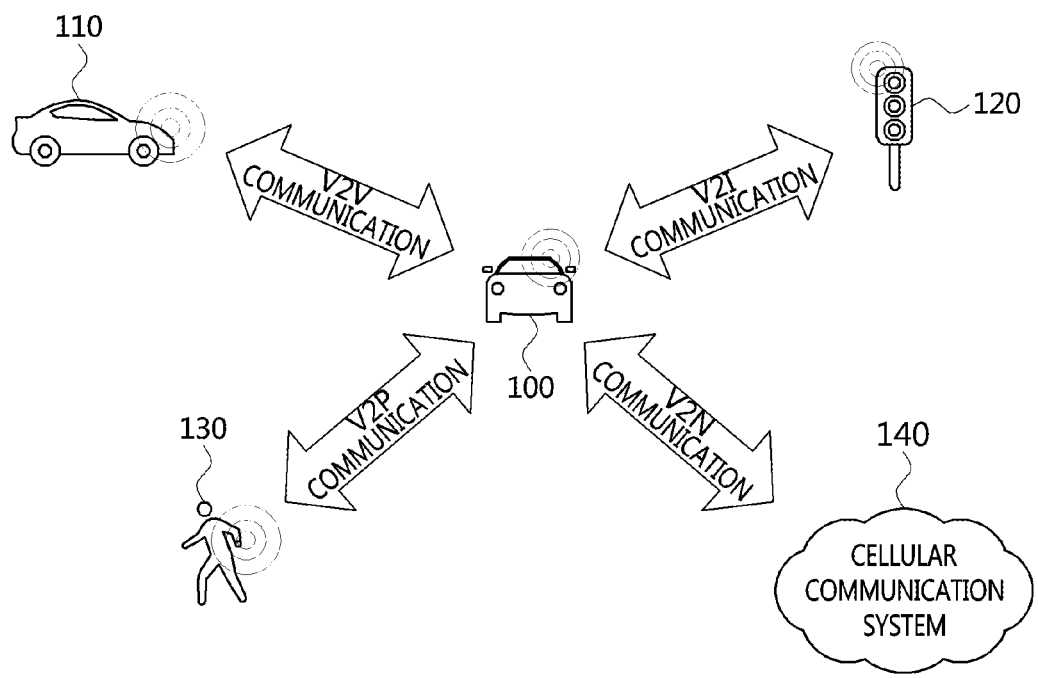
FIG. 1 is a conceptual diagram illustrating V2X communication scenarios.

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements. The terminology used herein is for the purpose of describing particular embodiments only and is not intended to be limiting of embodiments of the present disclosure. As used herein, the singular forms "a." "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related at and will not be interpreted in an idealized or overly formal sense unless expressly so defined herein.

Hereinafter, preferred exemplary embodiments of the present disclosure will be described in detail with reference to the accompanying drawings. In describing the present disclosure, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
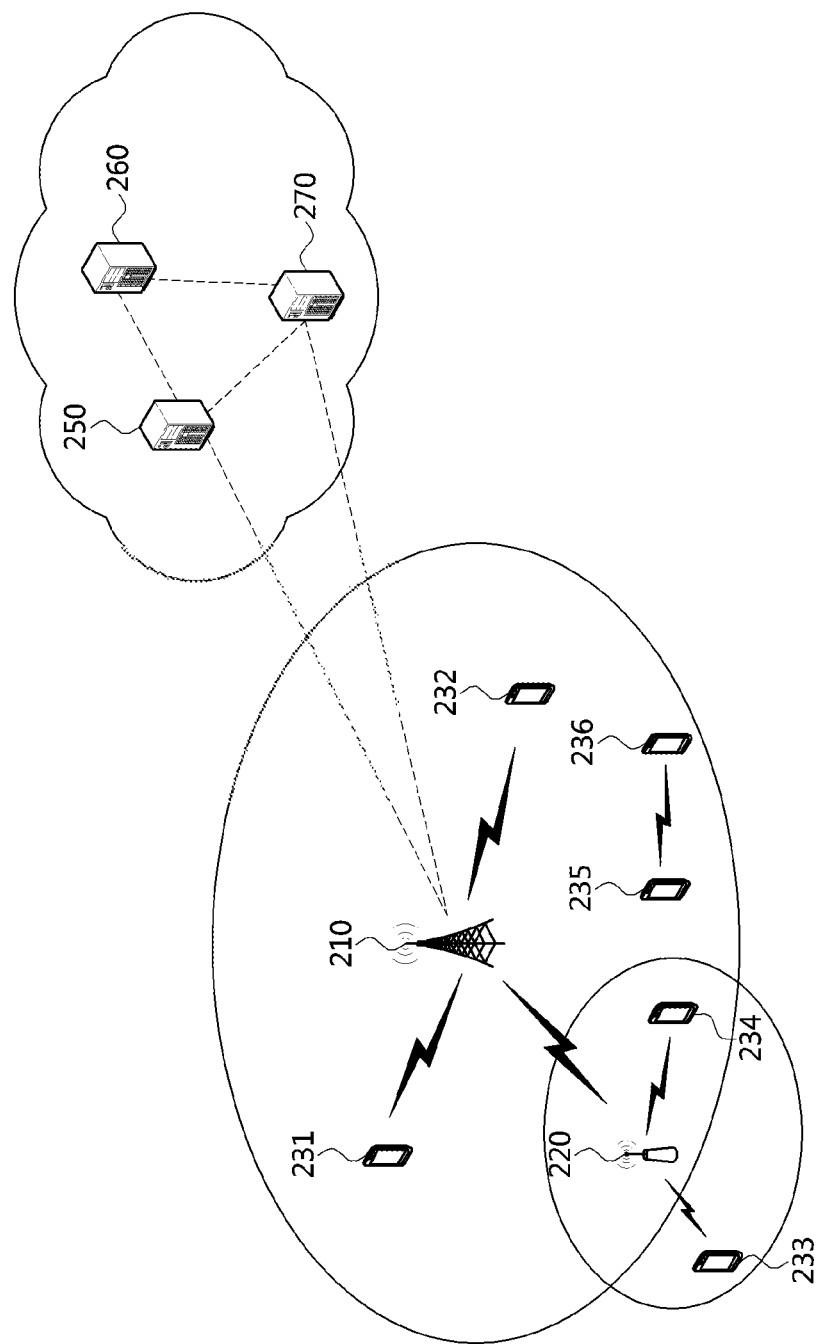
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles (100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW)260, a mobility management entity (MME) 270, and the like.

When the cellular communication system supports the 5G communication technology, the core network may include a user plane function (UPF) 250, a session management function (SMF)260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
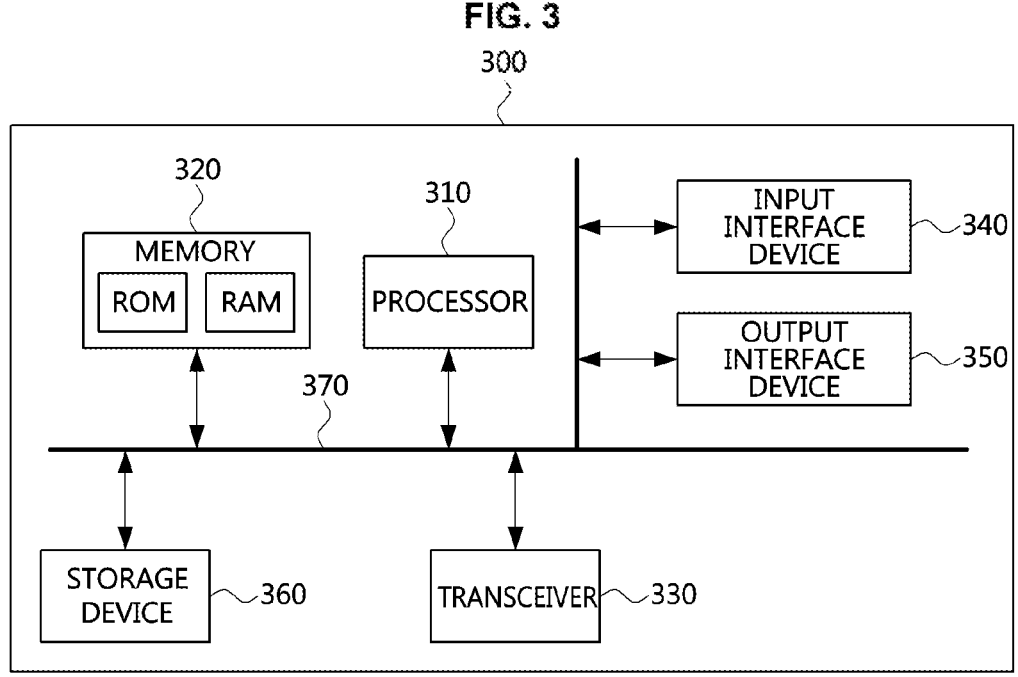
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 3W) may further comprise an input interface device 340, an output interface device 350, a storage device 360, and the like. Each component included in the communication node 30) may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a NodeB(NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
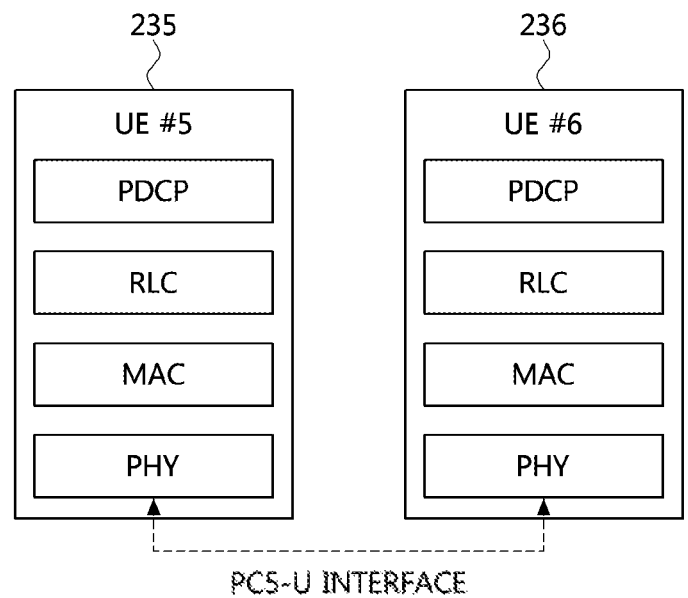
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
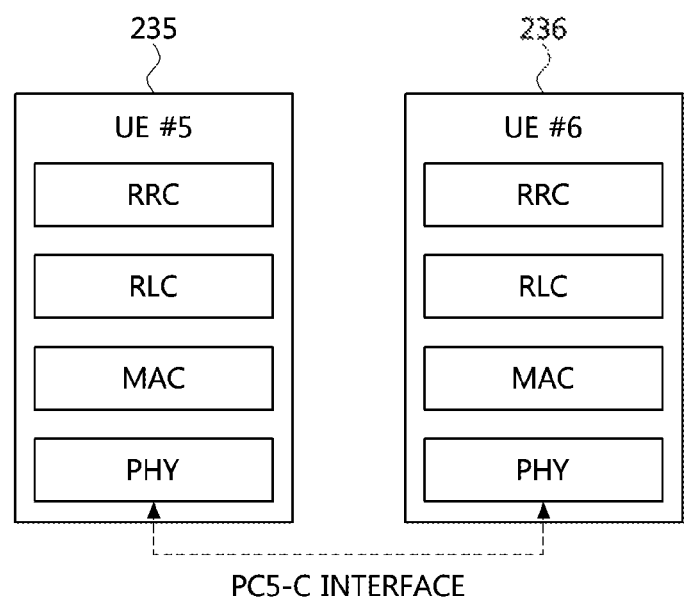
FIG. 5 is a block diagram illustrating a first exemplary embodiment of a control plane protocol stack of a UE performing sidelink communication.
Figure 6:
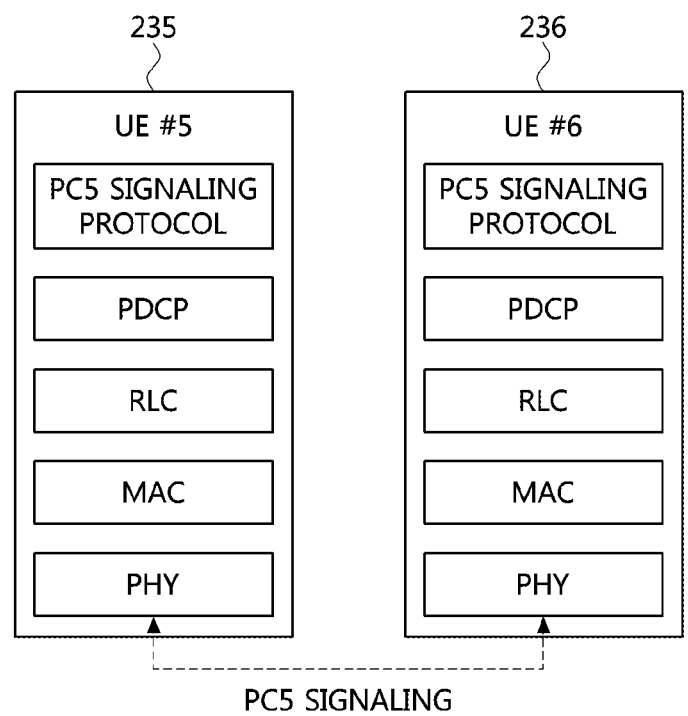
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel(PSCCH), a Physical Sidelink Discovery Channel(PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE antonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink groupcast communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

Figure 7:
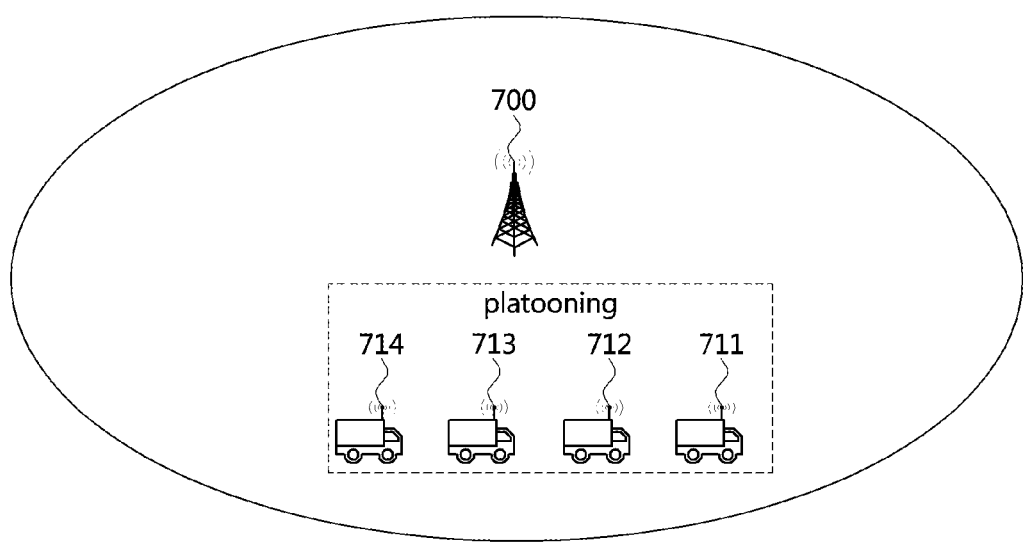
FIG. 7 is a conceptual diagram illustrating a platooning scenario in a communication system.

FIG. 7 is a conceptual diagram illustrating a platooning scenario in a communication system.

As shown in FIG. 7, a plurality of vehicles 711 to 714 may participate in platooning. One vehicle (e.g., a terminal located in the vehicle) among the plurality of vehicles 711 to 714 participating in the platooning may be referred to as a platoon leader (PL). For example, the vehicle 711 (e.g., UE #1 located in the vehicle 711) located at the head among the plurality of vehicles 711 to 714 participating in the platooning may be referred to as a PL or a header terminal. The PL 711 may lead the platooning and may control other vehicles 712 to 714.

Among the plurality of vehicles 711 to 714 participating in the platooning, the remaining vehicles 712 to 714 (e.g., terminals belonging to the vehicles) excluding the vehicle 711 may be referred to as platoon members (PMs) or member terminals. Alternatively, the last vehicle 714 among the plurality of vehicles 711 to 714 participating in the platooning may be referred to as a platoon tail (PT). The PMs 712 to 714 may operate under the control of the PL 711.

The plurality of vehicles 711 to 714 participating in the platooning may perform sidelink groupcast communication. In this case, the PL 711 may be referred to as a sidelink groupcast header (SGH), and the PMs 712 to 714 may be referred to as sidelink groupcast members (SGMs). That is, in exemplary embodiments below, the PL may mean the SGH, and the SGH may mean the PL. In addition, the PM may mean the SGM, and the SGM may mean the PM.

When the PL 711 is the UE 235 shown in FIG. 2, each of the PMs 712 to 714 may be the UE 236 shown in FIG. 2. Each of the PL 711, the PM 712, the PM 713, and the PM 714 may be configured identically or similarly to the communication node 300 shown in FIG. 3. For example, each of the PL 711, the PM 712, the PM 713, and the PM 714 may include an antenna array including a plurality of antenna elements. Each of the PL 711, the PM 712, the PM 713, and the PM 714 may support the protocols stack shown in FIGS. 4 to 6.

Each of the PL 711, the PM 712, the PM 713, and the PM 714 participating in the platooning may be connected to a base station 700 (e.g., RSU), and may perform communications with the base station 700 in a beamforming scheme. In this case, a pair of a transmission beam and a reception beam may be configured between the base station 700 and each the PL 711, the PM 712, the PM 713, and the PM 714, and beamforming-based communications may be performed using the pair of a transmission beam and a reception beam. Here, the reception beam may mean a reception direction.

In addition, sidelink communication may be performed among the PL 711, the PM 712, the PM 713, and the PM 714 participating in the platooning, and the sidelink communication may be performed in a beamforming scheme. In this case, a pair of a transmission beam and a reception beam may be configured for each pair among the PM 712, the PM 713, the PM 714, and the PL 711, and beamforming-based communications may be performed using the pair of a transmission beam and a reception beam. The pair of a transmission beam and reception beam may be configured through a beam management procedure (e.g., beam configuration procedure).

Meanwhile, transmission modes (TMs) for V2X communication may be defined as shown in Table 3 below.

TABLE 3

| V2X TM | Description |
| --- | --- |
| #1 | A terminal (i e., UE) may autonomously select sidelink resources for transmission. |
| #2 | A terminal may support sidelink resource selection for other terminal(s). |
| #3 | An NR configured grant (CG) (e.g., type-1) for sidelink transmission may be configured to a terminal. That is, the |

TABLE 3-continued

| V2X TM | Description |
| --- | --- |
|  | terminal may perform sidelink communications based on the NR CG. |
| #4 | A terminal may schedule sidelink transmission of other terminal(s). |

The V2X TMs defined in Table 3 may be used for sidelink communications between vehicles participating in platooning. Sidelink resources required according to the V2X TM may vary. Therefore, the base station may allocate sidelink resources required according to the V2X TM to the PL (e.g., SGH), and the PL may perform sidelink communications according to the V2X TM using the sidelink resources allocated by the base station. In exemplary embodiments below, sidelink communication methods according to the V2X TMs will be described.

Figure 8B:
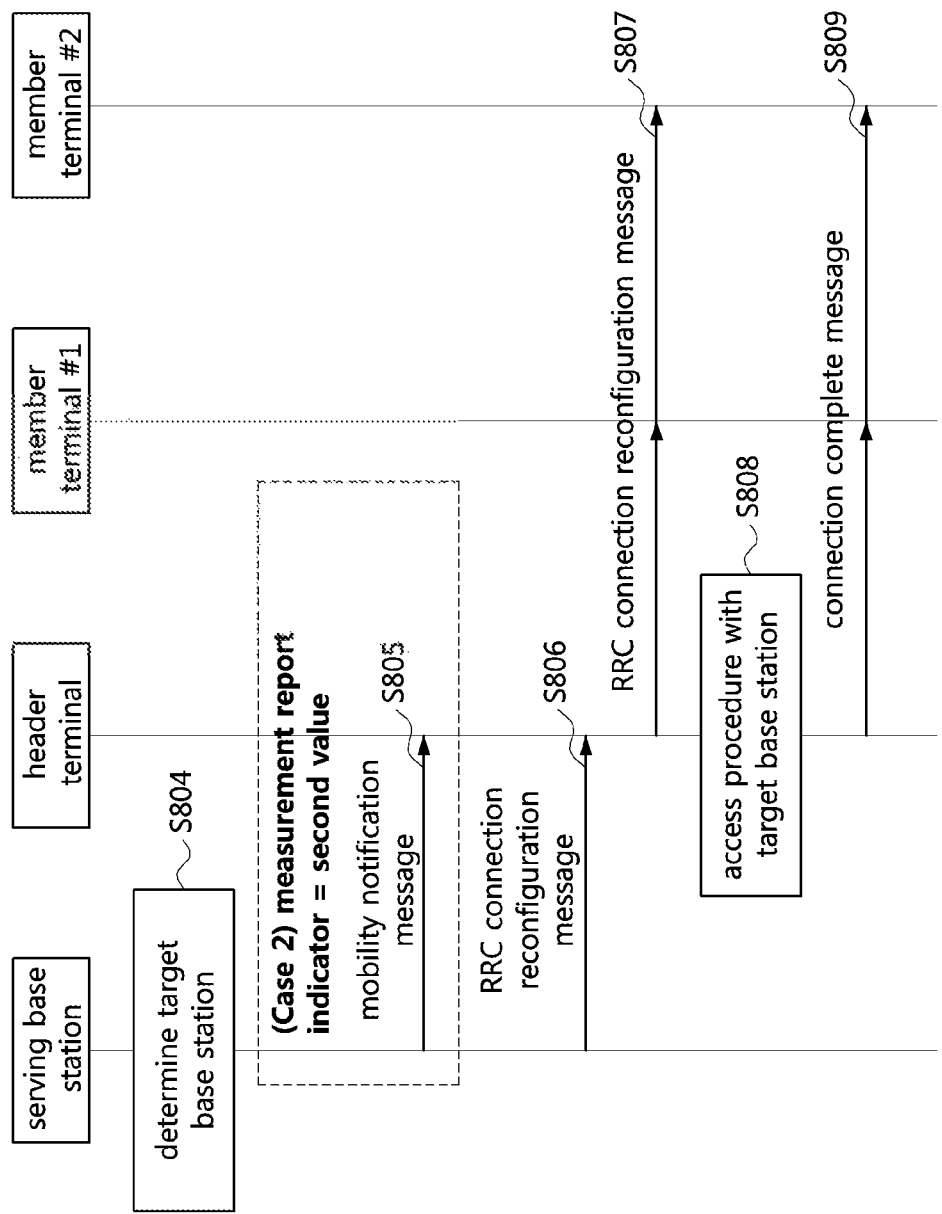
FIG. 8A is a sequence chart illustrating a first exemplary embodiment of a measurement reporting method in a group handover procedure.

FIG. 8A is a sequence chart illustrating a first exemplary embodiment of a measurement reporting method in a group handover procedure, and FIG. 8B is a sequence chart illustrating a first exemplary embodiment of a method of accessing a target base station in a group handover procedure. The operations shown in FIG. 8B may be performed after the operations shown in FIG. 8A.

As shown in FIGS. 8A and 8B, a communication system may include a serving base station, a header terminal, a member terminal #1, a member terminal #2, and the like. The serving base station, header terminal, member terminal #1, and member terminal #2 may be the base station 700, PL 711, PM 712, and PM 713 shown in FIG. 7, respectively. Each of the serving base station, header terminal, member terminal #1, and member terminal #2 may be configured identically or similarly to the communication node 30) shown in FIG. 3. Each of the member terminal #1 and member terminal #2 may support the protocol stacks shown in FIGS. 4 to 6.

The header terminal, member terminal #1, and member terminal #2 may belong to the same groupcast group, and may perform sidelink groupcast communications. The header terminal may manage/control the sidelink groupcast communications. The header terminal, member terminal #1, and member terminal #2 may access to the same serving base station. The header terminal may operate in an RRC connected state. Each of the member terminals #1 and #2 may operate in an RRC connected state, an RRC inactive state, or an RRC idle state. In a groupcast group configuration step, the header terminal may generate a groupcast configuration information message (e.g., GroupcastConfiguration message), and may transmit the groupcast configuration information message to the member terminals #1 and #2 (S800). The groupcast configuration information message may be an RRC message and may include groupcast configuration information. The groupcast configuration information message may include information elements listed in Table 4 below. In addition, the groupcast configuration information message may further include other information elements as well as the information elements listed in Table 4 below.

TABLE 4

```
-- ASN1START
    GroupcastConfigInformation-r15 ::=    SEQUENCE {
    criticalExtensions                   CHOICE {
        c1                                   CHOICE {
            groupcastConfigInformation-r16       GroupcastConfigInformation-r16,
            spare3 NULL spare2 NULL, spare1 NULL
        },
        criticalExtensionsFuture             SEQUENCE { }
```

TABLE 4-continued

```
      }
}
GroupcastConfigInformation-r16-IEs ::= SEQUENCE {
    group-RNTI                      Group-RNTI
    OPTIONAL,
    groupcastIdentity-r16           GroupcastIdentity-r16              OPTIONAL,
    sl-SSB                          SL-SSB
    OPTIONAL,
    HOAssistIndication-r16          ENUMERATED(true)                   OPTIONAL,
        -- Need ON
    ueCapabilityInformation         UECapabilityInformation-v1250  OPTIONAL,
    nonCriticalExtension            SEQUENCE { }
-- ASN1STOP
```

The groupcast configuration information message may include an identifier of the groupcast group (e.g., group-RNTI in Table 4), a groupcast identifier (e.g., groupcastIdentity in Table 4), information of an SS/PBCH block for sidelink communication (e.g., sl-SSB in Table 4), and the like. In addition, the groupcast configuration information message may further include information indicating a target of reporting a measurement result (e.g., HOAssistIndication in Table 4). In exemplary embodiments, the information indicating the target of reporting a measurement result may be referred to as a 'measurement report indicator'. The measurement result may be a result of a measurement operation on base station(s)(e.g., serving base station and/or one or more neighbor base stations) performed by the member terminals. The measurement report indicator set to a first value may indicate to report measurement information to the group header. The measurement report indicator set to a second value may indicate to report the measurement information to the serving base station.

In addition, the groupcast configuration information message may further include an offset and/or a threshold value used to determine whether a handover event (e.g., group handover event) occurs. The offset may be classified into a type1-offset used when a speed of a terminal (e.g., header terminal, member terminal) is greater than or equal to a speed threshold and a type2-offset used when a speed of a terminal (e.g., header terminal, member terminal) is less than the speed threshold. Also, the threshold value may be classified into a type1-threshold value used when a speed of a terminal (e.g., header terminal, member terminal) is equal to or greater than the speed threshold and a type2-threshold value used when a speed of a terminal (e.g., header terminal, member terminal) is less than the speed threshold. Here, the speed threshold may be included in the groupcast configuration information message.

Meanwhile, the serving base station may transmit system information (e.g., system information block (SIB) 26) including the measurement report indicator to the terminals (e.g., header terminal, member terminal #1, member terminal #2) belonging to the groupcast group. That is, the measurement report indicator may be transmitted through system information instead of the groupcast configuration information message. Alternatively, the measurement report indicator may be transmitted through both the groupcast configuration information message and system information.

When the measurement report indicator is transmitted through system information, a terminal that does not operate in the RRC connected state (e.g., a member terminal that operates in the RRC inactive state or the RRC idle state) may also obtain the measurement report indicator. The system information may include information elements listed in Table 5 below. In Table 5, HOAssitIndication may be the measurement report indicator. In addition, the system information may further include the speed threshold, the offset (e.g., type1-offset, type2-offset), and/or the threshold value (e.g., type1-threshold value, type2-threshold value).

TABLE 5

```
-- ASN1START ::= SEQUENCE {                                                                          -- Need
SystemInformation BlockType26-r15    SL-InterFreqInfoListV2X-r14                    OPTIONAL,
    v2x-InterFreqInfoList-r15
OR
    cbr-pssch-TxConfigList-r15       SL-CBR-PPPP-TxConfigList-r15                   OPTIONAL,       -- Need
OR
    v2x-PacketDuplicationConfig-r15  SL-V2X-PacketDuplicationConfig-r15             OPTONAL,        -- Need
OR
    syncFreqList-r15                 SL-V2X-SyncFreqList-r15                        OPTIONAL,       --
Need OR
    slss-TxMultiFreq-r15             ENUMERATED(true)                               OPTIONAL,       -- Need
OR
    v2x-FreqSelectionConfigList-r15  SL-V2X-FreqSelectionConfigList-r15             OPTIONAL,  -- Need OR
    threshS-RSSI-CBR-r14             INTEGER (0..45)                                OPTIONAL,       --
Need OR                                  ENUMERATED(true)                          OPTIONAL,       --
    HOAssistIndication-r16
    Need ON

...
}
-- ASN1STOP
```

When the measurement report indicator is transmitted through system information, the header terminal may obtain the measurement report indicator by receiving the system information from the serving base station. In this case, the header terminal may generate a groupcast configuration information message including a measurement report indicator having the same value (e.g., first value or second value) as the measurement report indicator included in the system information. The header terminal may transmit the groupcast configuration information message including the measurement report indicator to the member terminals #1 and #2.

The member terminals #1 and #2 may receive system information (e.g., system information listed in Table 5) from the serving base station. In addition, the member terminals #1 and #2 may receive the groupcast configuration information message (e.g., groupcast configuration information message shown in Table 4) from the header terminal. Each of the member terminals #1 and #2 may obtain the measurement report indicator from the system information and/or the groupcast configuration information message. When the measurement report indicator is set to the first value, the member terminals #1 and #2 may determine that the results of the measurement operations on base station(s) (e.g., serving base station and/or one or more neighbor base stations) are to be reported to the group header. When the measurement report indicator is set to the second value, member terminals #1 and #2 may determine that the results of the measurement operations on base station(s) (e.g., serving base station and/or one or more neighbor base stations) are to be reported to the serving base station.

The member terminals #1 and #2 may perform the measurement operations on base station(s) (e.g., serving base station and/or one or more neighbor base stations) (S801). For example, the member terminals #1 and #2 may receive reference signals from the serving base station and/or one or more neighbor base stations, and may measure reception qualities of the reference signals. Here, the reference signal may be CSI-RS, DM-RS, PT-RS, or the like. Alternatively, in order to measure the reception qualities for the base station(s), SS/PBCH blocks may be used instead of the reference signals. The reception quality may be a reference signal received power (RSRP), a reference signal strength indicator (RSSI), a reference signal received quality (RSRQ), a signal to noise ratio (SNR), or a signal to interference plus noise ratio (SINR).

In exemplary embodiments below, a case when the measurement report indicator is set to the first value may be defined as 'Case 1', and a case when the measurement report indicator is set to the second value may be defined as 'Case 2'.

Case 1

When the measurement report indicator is set to the first value, each of the member terminals #1 and #2 may transmit a measurement report message including a result of the measurement operation (e.g., reception quality information, information of a neighbor base station having a good reception quality) to the header terminal (S802-1). The measurement report message may include an identifier of the member terminal transmitting the measurement report message, reception quality information, and identifier(s) of neighbor base station(s) related to the corresponding reception quality information. Alternatively, another RRC message may be used instead of the measurement report message. The another RRC message may include information elements required for handover decision for the groupcast group (e.g., identifiers of the member terminals, reception quality information, identifier(s) of the base station(s) related to the corresponding reception quality information, etc.). For example, the another RRC message may include one or more information elements included in the measurement report message.

Each of the member terminals #1 and 2 may transmit the measurement report message to the header terminal when a handover event is satisfied. When a conditional handover (CHO) operation is performed, the handover event may be a handover preparation event or a handover execution event.

When a difference between a reception quality of a neighbor base station measured by the member terminal and a reception quality of the serving base station measured by the member terminal is equal to or greater than the type1-offset, type2-offset, 'existing offset+type1-offset', or 'existing offset+type2-offset', the member terminal may determine that a handover event occurs. Here, the member terminal may use the type1-offset or the type2-offset based on a result of comparing its own speed with the speed threshold. Alternatively, when a reception quality of a neighbor base station measured by the member terminal is greater than or equal to the type1-threshold value, type2-threshold value, 'existing threshold value+type1-threshold value', or 'existing threshold value+type2-threshold value', the member terminal may determine that a handover event occurs. Here, the member terminal may use the type1-threshold value or the type2-threshold value based on a result of comparing its own speed with the speed threshold. Alternatively, the measurement report message may be transmitted to the header terminal regardless of whether the handover event is satisfied.

The header terminal may receive the measurement report messages from the member terminals #1 and #2, and may identify the information elements included in the measurement report messages. The neighbor base station indicated by the measurement report message may be a neighbor base station that the header terminal does not know. That is, the header terminal may obtain information of the neighbor base station that it does not know through the measurement report messages received from the member terminals #1 and #2. The header terminal may generate a groupcast configuration report message based on the information elements included in the measurement report messages, and may transmit the groupcast configuration report message to the serving base station (S803-1). The groupcast configuration report message may be used to request resource allocation (e.g., allocation of resources for sidelink groupcast communication) to the serving base station. The groupcast configuration report message may include information elements listed in Table 6 below. In addition, the groupcast configuration report message may further include other information elements as well as the information elements listed in Table 6 below.

TABLE 6

```
-- ASN1START
GroupcastConfigReport-16 ::=          SEQUENCE {
    criticalExtensions                CHOICE {
```

TABLE 6-continued

```
    c1                                          CHOICE {
        groupcastConfigReport-r16               GroupcastConfigReport-r16,
        spare3 NULL, spare2 NULL, spare1 NULL
    },
        criticalextensonsFuture                 SEQUENCE { }
    }
}
GroupcastConfigReport-r16-IEs ::=               SEQUENCE {
    numberofGroupcastMember-r16                     NumberofGroupcastMember-r16         OPTIONAL,
    GroupcastMember-Identity-r16 L2 ID
    GroupcastMember-List ::=                        SEQUENCE (SIZE    (1..   NumberofGroupcastMember)   OF
GroupcastMember-Identity
    nonCriticalExtension                        SEQUENCE { }
}
NumberofGroupcastMember-r16::=                  INTEGER (1.xxx)
-- ASN1STOP
```

The groupcast configuration report message may include the number of member terminals managed/controlled by the header terminal (e.g., numberofGroupcastMember in Table 6), an identifier of the member terminal (e.g., GroupcastMember-Identity in Table 6), a list of the member terminals (e.g., GroupcastMember-List in Table 6), and the like. The identifier of the member terminal may be a layer 2 (e.g., access stratum (AS) layer) identifier. The layer 2 identifier (i.e., L2 ID) may be mapped one-to-one with a higher layer identifier. The list of member terminals may be a list of member terminals managed/controlled by the header terminal.

Case 2

When the measurement report indicator is set to the second value, each of the member terminals #1 and #2 may transmit a measurement report message including a result of the measurement operation (e.g., reception quality information) to the serving base station (S802-2). The measurement report message may include information elements listed in Table 7 below. In addition, the measurement report message may further include one or more information elements included in the existing measurement report message as well as the information elements shown in Table 7 below.

The measurement report message may include an identifier of the header terminal (e.g., GroupcastHeader-Identity of Table 7). In addition, the measurement report message may further include an identifier of a member terminal transmitting the measurement report message, reception quality information, an identifier of a neighbor base station related to the reception quality information, and the like. Each of the member terminals #1 and #2 may transmit the measurement report message to the base station when a handover event occurs. The neighbor base station indicated by the measurement report message may be the neighbor base station for which the handover event occurs. When a CHO operation is performed, the handover event may be a handover preparation event or a handover execution event. Alternatively, the measurement report message may be transmitted to the serving base station regardless of whether a handover event occurs.

Meanwhile, the serving base station may determine a target base station based on the groupcast configuration report message received from the header terminal in Case 1 or the measurement report messages received from the member terminals #1 and #2 in Case 2 (S804). For example, in Case 1, the serving base station may determine one

TABLE 7

```
-- ASN1START
MeasurementReport ::=                           SEQUENCE {
    citicalExtensions                               CHOICE {
        c1                                              CHOICE{
            measurementReport:r8                            MeasurementReport-r8-IEs,
            spare7 NULL,
            spare6 NULL, spare5 NULL, spare4 NULL
            spare3 NULL, spare2 NULL, spare1 NULL
        },
            criticalExtensionsFuture                SEQUENCE { }
    }
}
MeasurementRepont-r8-IEs ::=                    SEQUENCE {
    measResults                                     MeasResults,
    nonCriticalExtension                            MeasurementReport-v8a0-IEs OPTONAL,
}
MeasurementReport-v8a0-IEs ::= SEQUENCE {
    lateNonCriticalExtsnsion                        OCTET STEING                OPTIONAL,
    nonCriticalExtension                            MeasurementReport-r16-IEs   OPTIONAL,
}
MeasurementReport-r16-IEs ::= SEQUENCE {
    lateNonCriticalExtension                        OCTET STRING                OPTIONAL,
    GroupcastHeader-Identity-r16                    L2 ID
    nonCriticalExtension                            SEQUENCE { }               OPTIONAL,
}
-- ASN1STOP
``` neighbor base station from among one or more neighbor base stations indicated by the groupcast configuration report message as the target base station. In case 2, the serving base station may determine one neighbor base station among one or more neighbor base stations indicated by the measurement report messages as the target base station.

In this case, the serving base station may transmit, to the header terminal, a message (hereinafter, referred to as a 'mobility notification message') indicating that handover to the neighbor base station (e.g., target base station) detected by the member terminals #1 and #2 is to be performed (S805). The mobility notification message may include information elements listed in Table 8 below. The mobility notification message may be MeimberTriggeredMobilityNotifiction of Table 8 below. In addition, the mobility notification message may further include other information elements as well as the information elements listed in Table 8 below.

message to the target base station. The handover request message may include information of the header terminal and information of the member terminal(s) managed by the header terminal. For example, the handover request message may include the identifier of the header terminal, the identifier of the member terminal, a cell-radio network temporary identifier (C-RNTI) assigned to the header terminal by the serving base station, a C-RNTI assigned to the member terminal by the serving base station, context information of the header terminal (e.g., UE context information, RRC context information), context information of the member terminal (e.g., UE context information, RRC context information), bearer configuration information of the header terminal, bearer configuration information of the member terminal, information of an AS layer of the header terminal (e.g., security information), information of an AS layer of the member terminal (e.g., security information), and the like. The handover request message may include informa-

TABLE 8

```
-- ASN1START
MemberTriggeredMobilityNotification ::=        SEQUENCE {
    criticalExtensions                         CHOICE {
        c1                                         CHOICE{
            MemberTriggeredMobilityNotification-r16    MemberTriggeredMobilityNotification-
r16-IEs,
            spare7 NULL,
            spare6 NULL, spare5 NULL, spare4
NULL,
            spare3 NULL, spars2 NULL, spare1 NULL
        },
        criticalExtensionsFuture               SEQUENCE { }
    }
}
MemberTriggeredMobilityNotification-r16-IEs ::=   SEQUENCE {
    MobilityTriggerMember-Identity-r16            L2 ID,
    MobilityTriggerMember-List ::=                SEQUENCE (SIZE 1.. NumberofMobilityTriggerMember)
Of
                                                  MobilityTriggerMember-Identity
    physCellId                                    PhysCellId,
    cgi-Info                                      SEQUENCE {
        cellGlobalId                                  CellGlobsIdEUTRA,
        trackingAreaCode                              TrackingAreaCode,
        plmn-IdentityList                             PLMN-IdentityList2            OPTIONAL
    }
    nonCriticalExtension                          SEQUENCE { }                      OPTIONAL
}
-- ASN1STOP
```

The mobility notification message may include the identifier of the member terminal having transmitted the measurement report message to the serving base station (e.g., MobilityTriggerMember-Identity in Table 8), the list of the member terminals (e.g., MobilityTriggerMember-List in Table 8), a physical Cell ID (e.g., physCellId in Table 8), a cell global ID (e.g., cellGlobalId in Table 8), a tracking are (TA) code (e.g., trackingAreaCode in Table 8), a public land mobile network (PLMN) identifier list (e.g., plmn-IdentityList listed in Table 8), and the like. The identifier of the member terminal may be a layer 2 ID.

The header terminal may receive the mobility notification message from the serving base station, and may identify the information elements included in the mobility notification message. The header terminal may determine that a mobility operation (e.g., handover operation) is triggered by the member terminals indicated by the mobility notification message. In Case 1, since the header terminal receives the measurement report messages from the member terminals #1 and #2, the step S805 may not be performed.

Meanwhile, the base station may generate a handover request message and may transmit the handover request tion elements listed in Table 9 below. In addition, the handover request message may further include information elements included in the existing handover request message as well as the information elements shown in Table 9 below.

| Information elements | Description |
| --- | --- |
| UE context information.<br>>UE security capabilities<br>>AS security information<br>>E-RAB To be Setup List<br>>>E-RAB To be Setup Item | Context information of header terminal |
| >RRC context information | RRC HandoverPreparationInformation message or RRC HandoverPreparationInformation-NB message |
| List of Groupcast Member Context Information<br>>SEQUENCE (SIZE (1 . . . NumberofGroupcastMember) OF GroupcastMember-Identity<br>>>UE security capabilities<br>>>AS security information | List of L2 IDs of Groupcast Members managed by Groupcast Header |

| Information elements | Description |
| --- | --- |
| >>E-RAB To be Setup List<br>>>>E-RAB To be Setup Item | |
| >>RRC context information | RRC HandoverPreparationInformation message or RRC HandoverPreparationInformation-NB message |

The target base station may receive the handover request message from the serving base station, and may identify the information elements included in the handover request message. The target base station may determine whether to approve the handover for the groupcast group based on the information elements included in the handover request message. When the handover for the groupcast group is approved, the target base station may transmit a handover request acknowledgment (ACK) message to the serving base station. The handover request ACK message may include a C-RNTI(e.g., C-RNTI assigned by the target base station) for the header/member terminals, context information (e.g., UE context information, RRC context information), bearer configuration information, and the like.

In addition, the target base station may configure a group-RNTI for the sidelink groupcast communication and may transmit the group-RNTI to the serving base station. The group-RNTI may be included in the handover request ACK message. For resource allocation within a cell of the target base station, the target base station may map the group-RNTI to the terminals (e.g., header terminal and member terminals) belonging to the groupcast group. The handover request ACK message may include information elements listed in Table 10 below. In addition, the handover request ACK message may further include information elements included in the existing handover request ACK message as well as the information elements shown in Table 10 below.

TABLE 10

| Information elements | Description |
| --- | --- |
| E-RABs Admitted List<br>>E-RABs Admitted Item<br>List of Groupcast Member Context Information | |
| >SEQUENCE (SIZE (1 . . . NumberofGroupcastMember) OF GroupcastMember-Identity<br>E-RABs Admitted List<br>>E-RABs Admitted Item | List of L2 IDs of Groucast Members managed by Groupecast Header |
| transparent container from the target base station to the source base station, (e.g., serving base station) | RRC E-UTRA Handover Command message |

The serving base station may receive the handover request ACK message from the target base station, and may identify the information elements included in the handover request ACK message. The serving base station may generate an RRC connection reconfiguration message including information on the header terminal and member terminals, and may transmit the RRC connection reconfiguration message to the header terminal (S806). The RRC connection reconfiguration message may include an identifier of the target base station, resource configuration information of the target basestation(e.g., information on an exceptional resource pool), and the like.

The RRC connection reconfiguration message may include information elements listed in Tables 11 to 13 below. In addition, the RRC connection reconfiguration message may include information elements included in the existing RRC connection reconfiguration message as well as the information elements shown in Tables 11 to 13 below.

TABLE 11

```
-- ASN1START
RRCConnectionReconfiguration ::=      SEQUENCE {
rrc-TransactionIdentifier                RRC-TransactionIdentifier,
criticalExtensions                       CHOICE {
    c1                                       CHOICE{
        rrcConnectionReconfiguration-r8          RRCConnectionReconfiguration-r8-IEs,
        spare7 NULL,
        spare6 NULL, spare5 NULL, spare4 NULL,
        spare3 NULL, spare2 NULL, spare1 NULL
    },
    criticalExtensionsFuture                 SEQUENCE { }
}
SEQUENCE (SIZE (1.. NumberofGroupcastMember) OF GroupcastMember-Identity {
    rrc-TransactionIdentifier                RRC-TransactionIdentifier
    criticalExtensions                       CHOICE {
        c1                                       CHOICE{
            rrcConnectionReconfiguration-r8          RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture                 SEQUENCE { }
    }
}
```

TABLE 12

```
RRCConectionReconfiguration-rB-IEs ::= SEQUENCE {
    measConfig                         MeasConfig                                    OPTIONAL,
        -- Need ON
    mobilityControlInfo                MobilityControlInfo              OPTIONAL     -- Cond
HO
    dedicatedInfoNASList               SEQUENCE (SIZE(1..maxDRB)) OF
                                          DedicatedInfoNAS              OPTIONAL     --
Cond nonHO
    radioResourceConfigDedicated       RadioResourceConfigDedicated     OPTIONAL,    -- Cond HO-toEUTRA
    securityConfigHO                   SecurityConfigHO                 OPTIONAL,    -- Cond
HO
    nonCriticalExtension               RRCConnectionReconfiguration-v8So-IEs  OPTIONAL
}
...
RRCConnectionReconfiguration-v1430-IEs ::= SEQUENCE {
    sl-V2X-ConfigDedicated-r14         SL-V2X-ConfigDedicated-r14       OPTIONAL,    -- Need ON
    sCellToAddModListExt-v1430         SCellToAddModListExt-1430        OPTIONAL,    -- Need ON
    perCC-GapIndicationRequest-r14     ENUMERATED(true)                 OPTIONAL,    -- Need
ON
    systemInformationBlockType2Dedicated-r14   OCTET                    STRING       (CONTAINING
SystemInformationBlockType2}                                            OPTIONAL,    -- Cond
nonHO
    nonCriticalExtension               RRCConnectionkeconfiguration-v16-IEs  OPTIONAL
}
```

TABLE 13

```
RRCConnectionReconfiguration-v16-IEs ::= SEQUENCE {
    newUE-identity                     Group-RNTI
    groupcastIdentity-r16              GroupcastIdentityr16
    periodic-GroupcastGroupReport-timer-r16
        ENUMERATED (period1, period2, period3, period4, ..., periodn)   OPTIONAL,    --Need OR
    TxHOReconfigApplyIndication-r16    ENUMERATED(true)                 OPTIONAL,    --
Need ON
    nonCriticalExtension               SEQUENCE { }                     OPTIONAL,
}
SL-SyncTxControl-r12 ::=               SEQUENCE {
    networkControlledSyncTx-r12            ENUMERATED (on, off)         OPTIONAL,    -- Need
OP
}
...
SecurityConfigHO ::=                   SEQUENCE {
    handoverType                           CHOICE {
        intraLTE                               SEQUENCE {
            securityAlgorithmConfig                SecurityAlgorthmConfig  OPTIONAL, -- Cond
fullConfig
            keyChangeIndicator                     BOOLEAN,
            nextHopChainingCount                   NextHopChainingCount
        },                                     SEQUENCE {
        interRAT                           SecurityAlgorithmConfig,
            securityAlgorithmConfig            OCTET STRING (SIZE(6))
            nas-SecurityParamToEUTRA
        }
    },
    ...
}
-- ASN1STOP
```

The RRC connection reconfiguration message may indicate to use resources (e.g., exceptional resource pool) configured by the target base station instead of resources (e.g., dedicated resource) configured by the serving base station. That is, the RRC connection reconfiguration message may further include transmission information of a handover reconfiguration application indicator (e.g., TxHOReconfigApplyIndication in Table 13). The transmission information of the handover reconfiguration application indicator set to a first value may indicate the header terminal to transmit the handover reconfiguration application indicator to the member terminals in order to apply the resource pool configuration included in the RRC connection reconfiguration message. The transmission information of the handover reconfiguration application indicator set to a second value may indicate the header terminal not to transmit the handover reconfiguration application indicator to the member terminals.

The header terminal may receive the RRC connection reconfiguration message from the serving base station, and may identify the information elements included in the RRC connection reconfiguration message. When the transmission information of the handover reconfiguration application indicator included in the RRC connection reconfiguration message received from the serving base station is set to the first value, the header terminal may transmit the information element(s) included in the corresponding RRC connection reconfiguration message to the member terminals #1 and #2 (S807). The information element(s) transmitted from the header terminal to the member terminals #1 and #2 may be transmitted in form of an RRC connection reconfiguration message. The RRC connection reconfiguration message may be transmitted from the header terminal to each of the member terminals #1 and #2 through a PC5 interface.

The header terminal may indicate the member terminals #1 and #2 to use the resource configuration (e.g., exceptional resource pool) of the target base station by transmitting the RRC connection reconfiguration message. The RRC connection reconfiguration message transmitted from the header terminal to the member terminals #1 and #2 may include information elements shown in Tables 14 to 16 below. In addition, the RRC connection reconfiguration message may include information elements included in the existing RRC connection reconfiguration message as well as the information elements shown in Tables 14 and 16 below. The RRC connection reconfiguration message may include a handover reconfiguration application indicator (e.g., HOReconfigApplyIndication described in Table 15). The handover reconfiguration application indicator set to a first value may indicate the member terminals to apply the resource pool configuration included in the RRC connection reconfiguration message. Alternatively, the handover reconfiguration application indicator set to the first value may indicate the member terminals to apply the resource pool configuration included in the RRC connection reconfiguration message as well as the resource pool configuration of the serving base station. The handover reconfiguration application indicator set to the second value may indicate the member terminals not to apply the resource pool configuration included in the RRC connection reconfiguration message.

TABLE 14

```
- ASN1START
RRCConnectionReconfiguration ::=       SEQUENCE {
    rrc-TransactionIdentifier              RRC-TransactionIdentifier,
    criticalExtensions                     CHOICE {
      c1                                   CHOICE{
         rrcConnectionReconfiguration-r8   RRCConnectionReconfiguration-r8-IEs,
         spare7 NULL,
         spare6 NULL, spare5 NULL, spare4 NULL,
         spare3 NULL, spare2 NULL, spare1 NULL
      },
      criticalExtensionsFuture             SEQUENCE { }
    }
}
RRCConnectionReconfiguration-r8-IEs ::= SEQUENCE {
    measConfig                             MeasConfig                          OPTIONAL,
    -- Need ON
    mobilityControlInfo                    MobilityControlInfo                 OPTIONAL,    -- Cond HO
    dedicatedInfoNASList                   SEQUENCE (SIZE(1..maxDRB)) OF
                                              DedicatedInfoNAS                 OPTIONAL,    --
Cond nonHO
    radioResourceConfigDedicated           RadioResourceConfigDedicated OPTIONAL, -- Cond HO-toEUTRA
    securityConfigHO                       SecurityConfigHO                    OPTIONAL    -- Cond HO
                                           RRCConnectionReconfiguration-v890-IEs  OPTIONAL
    nonCritical Extension
}
```

TABLE 15

```
RRCConectionReconfiguration-v1430-IEs ::= SEQUENCE {
    sl-V2X-ConfigDedicated-r14             SL-VZX-ConfigDedicated-r14      OPTIONAL,   -- Need ON
    sCellToAddModListExt-v1430             SCellToAddModListExt-v1430      OPTIONAL,   -- Need ON
    perCC-GapIndicationRequest-r14         ENUMERATED(true)                OPTIONAL,   -- Need
ON
    systemInformationBlockType2Dedicated-r14   OCTET                      STRING      (CONTAINING
SystemInformationBlockType2}                                              OPTIONAL    -- Cond
nonHO
    nonCriticalExtension                   RRCConnectionReconfiguration-v16-iEs  OPTIONAL
}
RRCConnectionReconfiguration-v16-IEs ::= SEQUENCE {                       OPTIONAL    -- Need OR
    newUE-Identity                         Group-RNTI
    groupcastIdentity-r16                  GroupcastIdentity-r16
    periodic-GroupcstGroupReport-timer-r16
      ENUMERATED (period1, period2, period3, period4, ..., periodn)       OPTIONAL    -- Need OR
    HOReconfigApplyIndication-r16ENUMERATED(true)                         OPTIONAL    -- Need ON
    nonCriticalExtension                   SEQUENCE { }                   OPTIONAL
}
SL-SyncTxControl-r12 ::=                   SEQUENCE {
    netwotkControlledSyncTx-r12               ENUMERATED {on, off}        OPTIONAL    -- Need
OP
}
```

TABLE 16

```
SL-SyncTxControl-r12 ::=           SEQUENCE {
    networkContr olledSync ix -11 2   ENUMERATED (on, off)   OPTIONAL   -- Need
OP
}
...
SecurityConfigHO ::=               SEQUENCE {
    handoverType                       CHOICE {
        intraLTE                           SEQUENCE {
            securityAlgorithmConfig            SecurityAlgorithmConfig    OPTIONAL   -- Cond
fullConfig
            keyChangeIndicator                 BOOLEAN,
            nextHopChainingCount               NextHopChainingCount
        },
        interRAT                           SEQUENCE {
            securityAlgorithmConfig            SecurityAlgorithmConfig,
            nas-SecurityParamToEUTRA           OCTET STRING (SIZE6))
        }
    },
    ...
}
-- ASN1STOP
```

The member terminals #1 and #2 may receive the RRC connection reconfiguration message from the header terminal, and may identify the information elements included in the RRC connection reconfiguration message. When the handover reconfiguration application indicator included in the RRC connection reconfiguration message is set to the first value, the member terminals #1 and #2 may use the resource configuration (e.g., exceptional resource pool) of the target base station included in the RRC connection reconfiguration message. Alternatively, when the handover reconfiguration application indicator is set to the first value, the member terminals #1 and #2 may use the resource configuration of the target base station as well as the resource configuration of the serving base station.

After transmitting the RRC connection reconfiguration message to the member terminals #1 and #2, the header terminal may perform an access procedure with the target base station (S808). Alternatively, the access procedure between the header terminal and the target base station may be performed before transmission of the RRC connection reconfiguration message. In the access procedure between the header terminal and the target base station, a random access procedure and a transmission/reception procedure of an RRC message (e.g., RRC connection reconfiguration complete message) may be performed. When the access procedure between the header terminal and the target base station is completed, the header terminal may transmit a message indicating that the access procedure is completed (hereinafter, referred to as 'connection completion message') to the member terminals #1 and #2 (S809). The connection completion message may be used to indicate the member terminals #1 and #2 to release the connection with the serving base station.

The connection completion message may include AS layer configuration (i.e., ASLayerConfiguration) of Table 17 below. That is, the connection completion message may be an RRC message including the AS layer configuration. Alternatively, the connection completion message may be an RRC message other than the RRC message including the AS layer configuration.

TABLE 17

```
-- ASN1START
ASLayerConfiguration ::= SEQUENCE {
    rrcTransactionIdentifier      RRC-TransactionIdentifier,
    criticalExtensions            CHOICE {
        c1                            CHOICE{
            aslayerConfiguration-r16      AslayerConfiguration-r16-IEs,
            spare3 NULL, spare2 NULL, spare1 NULL
        },
        criticalExtensionsFuture      SEQUENCE { }
    }
}
AsLayerConfiguration-r16-IEs ::= SEQUENCE {
    HOCompleteIndication-r16      ENUMERATED(true)           OPTIONAL,   -- Need
ON
    lateNonCriticalExtension      OCTET STRING               OPTIONAL,
    nonCriticalExtension          SEQUENCE { }               OPTIONAL
}
```

The member terminals #1 and #2 may receive the connection completion message from the header terminal. In this case, the member terminals #1 and #2 may stop using the resource pool configured by the serving base station, and may use the resource pool (e.g., resource pool configured by the target base station) indicated by the RRC connection reconfiguration message received from the header terminal. In addition, the member terminals #1 and #2 may release the connection with the serving base station. Here, the resource pool configured by the target base station may be a mode 1 Tx resource pool or a mode 2 Tx resource pool.

When the above-described operations are completed (i.e., when the group handover operation is completed), the target base station may operate as a serving base station for the header terminal and the member terminals #1 and #2. That is, all terminals (e.g., header terminal and member terminals) participating in the sidelink groupcast communication may be handed over to the same target base station. The sidelink groupcast communication may be performed using resources configured by the new serving base station.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a header terminal in sidelink groupcast communication, the operation method comprising:
    transmitting, to member terminals participating in the sidelink groupcast communication, a configuration information message including a first indicator indicating a target of measurement reporting;
    receiving, from the member terminals, measurement report messages including results of measurement operations on one or more neighbor base stations when the target of measurement reporting indicated by the first indicator is the header terminal;
    transmitting, to a serving base station to which the header terminal is connected, a configuration report message including the results of the measurement operations;
    receiving, from the serving base station, a first connection reconfiguration message including configuration information of a target base station determined based on the results of the measurement operations;
    transmitting a second connection reconfiguration message including the configuration information of the target base station to the member terminals;
    performing an access procedure with the target base station based on the configuration information of the target base station; and
    transmitting, to the member terminals, a connection completion message indicating release of connection with the serving base station when the access procedure between the header terminal and the target base station is completed.

2. The operation method according to claim 1, wherein each of the measurement report messages includes at least one of an identifier of a member terminal transmitting the measurement report message, reception quality information, an identifier of a neighbor base station related to the reception quality information, or combinations thereof.

3. The operation method according to claim 1, wherein the measurement report messages are received when a handover event occurs in the member terminals, whether the handover event occurs is determined based on an offset or a threshold value, and the offset or the threshold value is included in the configuration information message.

4. The operation method according to claim 1, wherein the configuration report message further includes information indicating a number of the member terminals and an identifier of each of the member terminals.

5. The operation method according to claim 1, wherein the configuration information of the target base station includes an identifier of the target base station and resource pool information of the target base station.

6. The operation method according to claim 1, wherein the second connection reconfiguration message further includes a second indicator indicating application of configuration information of the serving base station and the configuration information of the target base station.

7. An operation method of a member terminal in sidelink groupcast communication, the operation method comprising:
    receiving, from a header terminal managing the sidelink groupcast communication, a configuration information message including a first indicator indicating a target of measurement reporting;
    performing a measurement operation on a serving base station to which the header terminal is connected and one or more neighbor base stations;
    transmitting, to the header terminal, a measurement report message including a result of the measurement operation when the target of measurement reporting indicated by the first indicator is the header terminal; and
    receiving, from the header terminal, a connection reconfiguration message including configuration information of a target base station determined by the serving base station based on the results of the measurement operation;
    when the access procedure between the header terminal and the target base station based on the configuration information of the target base station is completed, receiving, from the head terminal, a connection completion message indicating release of connection with the serving base station.

8. The operation method according to claim 7, wherein the measurement report message is transmitted when a handover event occurs, whether the handover event occurs is determined based on an offset or a threshold value, and the offset or the threshold value is included in the configuration information message.

9. The operation method according to claim 7, further comprising receiving, from the serving base station, system information including the first indicator.

* * * * *